(12) United States Patent
Zaiki et al.

(10) Patent No.: US 10,204,410 B2
(45) Date of Patent: Feb. 12, 2019

(54) MEDICAL IMAGE PROCESSING APPARATUS AND MEDICAL IMAGE PROCESSING METHOD

(71) Applicant: TOSHIBA MEDICAL SYSTEMS CORPORATION, Otawara-shi (JP)

(72) Inventors: Ryuji Zaiki, Utsunomiya (JP); Takuya Sakaguchi, Utsunomiya (JP); Tadaharu Kobayashi, Otawara (JP)

(73) Assignee: Toshiba Medical Systems Corporation, Otawara-shi (JP)

( * ) Notice: Subject to any disclaimer, the term of this patent is extended or adjusted under 35 U.S.C. 154(b) by 149 days.

(21) Appl. No.: 15/292,590

(22) Filed: Oct. 13, 2016

(65) Prior Publication Data

US 2017/0103526 A1 Apr. 13, 2017

(30) Foreign Application Priority Data

Oct. 13, 2015 (JP) ................................. 2015-202364

(51) Int. Cl.
*G06K 9/00* (2006.01)
*G06T 7/00* (2017.01)

(52) U.S. Cl.
CPC .. *G06T 7/0012* (2013.01); *G06T 2207/10116* (2013.01)

(58) Field of Classification Search
CPC .................. G06T 2207/10116; G06T 7/0012
See application file for complete search history.

(56) References Cited

U.S. PATENT DOCUMENTS

| 2005/0251010 A1 | 11/2005 | Mistretta et al. |
| 2009/0097731 A1 | 4/2009 | Sanada et al. |
| 2013/0261445 A1 | 10/2013 | Ertel et al. |
| 2015/0371381 A1* | 12/2015 | Sato ...................... G06T 7/0012 |
| | | 382/132 |

FOREIGN PATENT DOCUMENTS

| JP | 2007-536062 | 12/2007 |
| JP | 2011-212314 | 10/2011 |
| JP | 5093727 | 12/2012 |

* cited by examiner

*Primary Examiner* — Nirav G Patel
(74) *Attorney, Agent, or Firm* — Oblon, McClelland, Maier & Neustadt, L.L.P.

(57) ABSTRACT

A medical image processing apparatus according to an embodiment includes processing circuitry. The processing circuitry is configured to obtain a chronological transition of signal intensities for each of the pixels in a plurality of X-ray images chronologically acquired by using a contrast media. The processing circuitry is configured to correct the chronological transition of the signal intensities on the basis of a level of similarity between at least two mutually-different signal intensities within the chronological transition of the signal intensities.

10 Claims, 10 Drawing Sheets

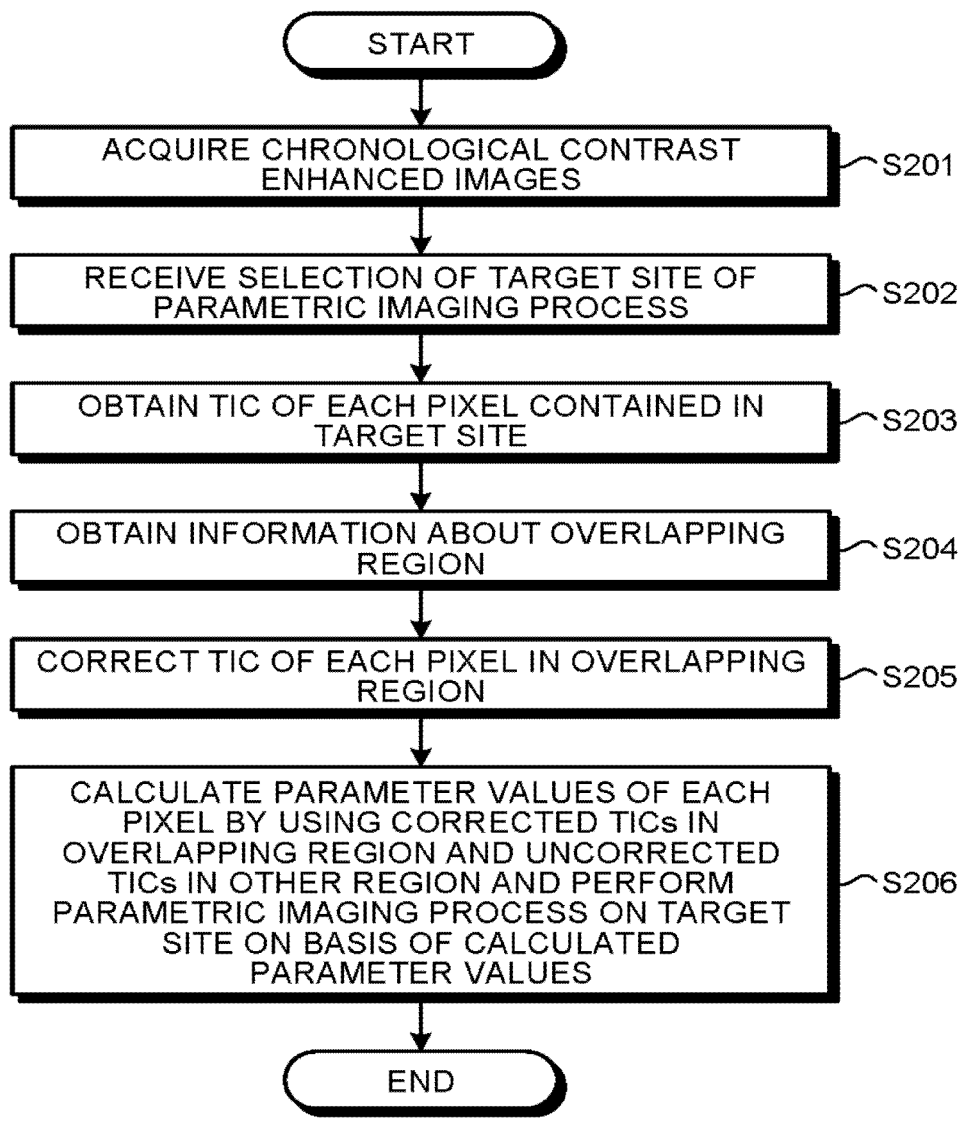

MEDICAL IMAGE PROCESSING APPARATUS AND MEDICAL IMAGE PROCESSING METHOD

CROSS-REFERENCE TO RELATED APPLICATIONS

This application is based upon and claims the benefit of priority from Japanese Patent Application No. 2015-202364, filed on Oct. 13, 2015; the entire contents of which are incorporated herein by reference.

FIELD

Embodiments described herein relate generally to a medical image processing apparatus and a medical image processing method.

BACKGROUND

Conventionally, X-ray diagnosis apparatuses are known to use an image expressing method by which blood flow information acquired by injecting a contrast media is expressed with predetermined parameter values. In the following sections, such an image expressing method will be referred to as parametric imaging. During the parametric imaging process described above, a Time-Intensity Curve (TIC) of the contrast media is calculated for each of the pixels, and various types of parameter values are further calculated by using the calculated TICs. TICs may also be called Time Density Curves (TDCs). Examples of the parameter values calculated during parametric imaging processes include: Time To Peak (TIP) indicating the time period until the TIC reaches a peak; a Peak Height (PH) indicating the height of the peak; an Area Under Curve (AUC) indicating the area of the TIC; Arrival Time (AT) indicating the period of time it takes for the contrast media to arrive; a Wash Out value indicating the time period from the peak to the time when the contrast media finishes flowing out; and Mean Transit Time (MIT).

During the parametric imaging process, parameter values corresponding to blood flow information desired by a viewer are calculated for each of the pixels, so that an image is generated and displayed by expressing each of the pixels in the image while using a color corresponding to a certain one of the calculated parameter values. Accordingly, the viewer is able to make various types of diagnoses on the basis of the blood flow information expressed by the displayed image. For example, a diagnosis is made by taking a contrast enhanced image of both of the pulmonary arteries for the purpose of checking an embolization state of the pulmonary arteries. Such a diagnosis procedure is expected to make use of parametric imaging. For the pulmonary arteries, it is expected that a useful diagnosis can be made by comparing the manners in which the blood vessels are visibly rendered due to the contrast media between the left lung and the right lung. In other words, when any of the blood vessels has embolization, the manners in which the blood vessels are visibly rendered due to the contrast media are different between the left lung and the right lung. It is therefore possible to make a diagnosis on the embolization state of the pulmonary arteries, by observing the difference in the manners in which the blood vessels are visibly rendered.

BRIEF DESCRIPTION OF THE DRAWINGS

FIG. 10 is a flowchart of a procedure in a process performed by an X-ray diagnosis apparatus according to the third embodiment.

DETAILED DESCRIPTION

According to an embodiment, a medical image processing apparatus includes processing circuitry. The processing circuitry is configured to obtain a chronological transition of signal intensities for each of the pixels in a plurality of X-ray images chronologically acquired by using a contrast media. The processing circuitry is configured to correct the chronological transition of the signal intensities on the basis of a level of similarity between at least two mutually-different signal intensities within the chronological transition of the signal intensities.

Exemplary embodiments of a medical image processing apparatus, an X-ray diagnosis apparatus, and a medical image processing method of the present disclosure will be explained in detail below, with reference to the accompanying drawings. Possible embodiments of the medical image processing apparatus and the X-ray diagnosis apparatus of the present disclosure are not limited to the embodiments described below.

First Embodiment

Figure 1:
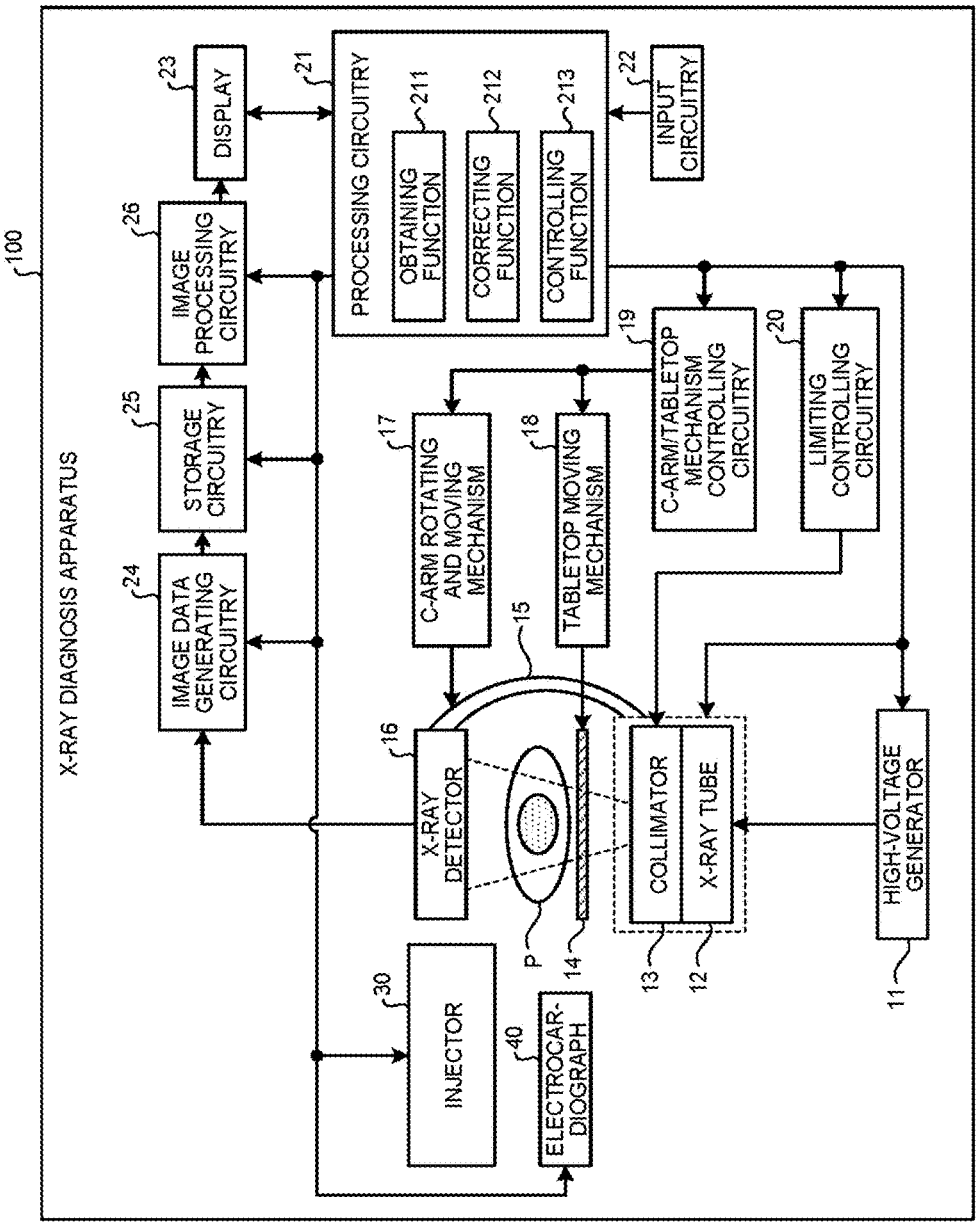
FIG. 1 is a diagram of an exemplary configuration of an X-ray diagnosis apparatus according to a first embodiment.

FIG. 1 is a diagram of an exemplary configuration of an X-ray diagnosis apparatus 100 according to a first embodiment. As illustrated in FIG. 1, the X-ray diagnosis apparatus 100 according to the first embodiment includes a high-voltage generator 11, an X-ray tube 12, a collimator 13, a tabletop 14, a C-arm 15, and an X-ray detector 16. Further, the X-ray diagnosis apparatus 100 according to the first embodiment includes a C-arm rotating and moving mechanism 17, a tabletop moving mechanism 18, C-arm/tabletop mechanism controlling circuitry 19, limiting controlling circuitry 20, processing circuitry 21, input circuitry 22, and a display 23. Also, the X-ray diagnosis apparatus 100 according to the first embodiment includes image data generating circuitry 24, storage circuitry 25, and image processing circuitry 26. Further, the X-ray diagnosis apparatus 100 is connected to an injector 30 and an electrocardiograph 40. Further, as illustrated in FIG. 1, in the X-ray diagnosis apparatus 100, the circuitry is connected to one another so that various types of electrical signals are transmitted to and received from one another and so that electrical signals are transmitted to and received from the injector 30.

The injector 30 is a device used for injecting a contrast media through a catheter inserted into a subject P. In this situation, the injection of the contrast media from the injector 30 is performed according to an injection instruction received via the processing circuitry 21 (explained later). More specifically, the injector 30 is configured to perform the injection of the contrast media in accordance with a contrast media injection start instruction, a contrast media injection stop instruction, and contrast media injection conditions including an injection speed that are received from the processing circuitry 21 (explained later). Alternatively, it is also acceptable to configure the injector 30 so as to start the injection or stop the injection according to an injection instruction directly input to the injector 30 by an operator.

The electrocardiograph 40 is configured to obtain an electrocardiogram (ECG) of the subject P to whom terminals (not illustrated) are attached and to transmit the obtained ECG to the processing circuitry 21, the image data generating circuitry 24, and the image processing circuitry 26, together with time information.

In the X-ray diagnosis apparatus 100 illustrated in FIG. 1, processing functions thereof are stored in the storage circuitry 25 in the form of computer-executable programs. The C-arm/tabletop mechanism controlling circuitry 19, the limiting controlling circuitry 20, the processing circuitry 21, the image data generating circuitry 24, and the image processing circuitry 26 are processors each configured to realize the function corresponding to a different one of the programs by reading and executing the program from the storage circuitry 25. In other words, each of the circuitry that has read the corresponding one of the programs has the function corresponding to the read program.

The term "processor" used in the explanation above denotes, for example, a circuit such as a Central Processing Unit (CPU), a Graphics Processing Unit (GPU), an Application Specific Integrated Circuit (ASIC), a programmable logic device (e.g., a Simple Programmable Logic Device [SPLD], Complex Programmable Logic Device [CPLD]), or a Field Programmable Gate Array (FPGA). Each of the processors realizes the function thereof by reading and executing the corresponding one of the programs stored in the storage circuit. Alternatively, it is also acceptable to directly incorporate the program into the circuit of each of the processors, instead of having the programs stored in the storage circuitry. In that situation, each of the processors realizes the function thereof by reading and executing the program incorporated in the circuit thereof. Each of the processors according to the first embodiment does not necessarily have to be configured as a single circuit individually. Alternatively, a plurality of independent circuits may be combined together to structure a single processor so as to realize the functions thereof.

The high-voltage generator 11 is configured to generate a high voltage and supply the generated high voltage to the X-ray tube 12 under control of the processing circuitry 21. The X-ray tube 12 is configured to generate X-rays by using the high voltage supplied from the high-voltage generator 11.

The collimator 13 is configured to limit the X-rays generated by the X-ray tube 12 so as to be selectively radiated onto a region of interest of the subject P, under control of the limiting controlling circuitry 20. For example, the collimator 13 includes four slidable limiting blades. Under the control of the limiting controlling circuitry 20, the collimator 13 limit the X-rays generated by the X-ray tube 12 so as to be radiated onto the subject P, by sliding the limiting blades. The tabletop 14 is a bed on which the subject P is placed and is arranged on a table (not illustrated). In this situation, the subject P is not included in the X-ray diagnosis apparatus 100.

The X-ray detector 16 is configured to detect X-rays that have passed through the subject P. For example, the X-ray detector 16 includes detecting elements arranged in a matrix formation. The detecting elements are configured to convert the X-rays that have passed through the subject P into electrical signals, to accumulate the electrical signals therein, and to transmit the accumulated electrical signals to the image data generating circuitry 24.

The C-arm 15 is configured to hold the X-ray tube 12, the collimator 13, and the X-ray detector 16. The X-ray tube with the collimator 13 and the X-ray detector 16 are arranged by the C-arm 15 so as to oppose each other while the subject P is interposed therebetween. Although FIG. 1 illustrates an example in which the X-ray diagnosis apparatus 100 is a single-plane apparatus, possible embodiments are not limited to this example. The X-ray diagnosis apparatus 100 may be a biplane apparatus.

The C-arm rotating and moving mechanism 17 is a mechanism used for rotating and moving the 15. The tabletop moving mechanism 18 is a mechanism used for moving the tabletop 14. The C-arm/tabletop mechanism controlling circuitry 19 is configured to adjust the rotating and the moving of the C-arm 15 and the moving of the tabletop 14, by controlling the C-arm rotating and moving mechanism 17 and the tabletop moving mechanism 18, under the control of the processing circuitry 21. The limiting controlling circuitry 20 is configured control the radiation range of the X-rays radiated onto the subject 8, by adjusting the opening degree of the limiting vanes included in the collimator 13, under the control of the processing circuitry 21.

The image data generating circuitry 24 is configured to generate image data by using the electrical signals converted from the X-rays by the X-ray detector 16 and to store the generated image data into the storage circuitry 25. For example, the image data generating circuitry 24 generates the image data by applying a current/voltage conversion, an Analog/Digital (AD) conversion, and/or a parallel/serial conversion to the electrical signals received from the X-ray detector 16. In one example, the image data generating circuitry 24 generates image data (a mask image) taken while the subject has no contrast media injected therein and image data (a contrast image) taken while the subject has a contrast media injected therein. Further, the image data generating circuitry 24 stores the mask image and the contrast image that were generated, into the storage circuitry 25.

The storage circuitry 25 is configured to receive and store therein the image data generated by the image data generating circuitry 24. For example, the storage circuitry 25 stores therein pieces of image data of the subject P taken before and after the contrast media is administered. Further, the storage circuitry 25 stores therein the programs corresponding to the various types of functions that are read and executed by the circuitry illustrated in FIG. 1. In one example, the storage circuitry 25 stores therein a program corresponding to an obtaining function 211, a program corresponding to a correcting function 212, and a program corresponding to a controlling function 213 that are read and executed by the processing circuitry 21.

The image processing circuitry 26 is configured to perform various types of image processing processes on the image data stored in the storage circuitry 25. For example, the image processing circuitry 26 generates a difference image by reading the mask image and the contrast image stored in the storage circuitry 25 and performing a subtracting (a Log sub) process thereon. Further, the image processing circuitry 26 calculates various types of parameters by using a Time-Intensity Curve (TIC) of the contrast media of each of the pixels in chronological difference images and further performs a parametric imaging process on the basis of calculated parameter values. In other words, the image processing circuitry 26 calculates, for each of the pixels, the parameter values corresponding to blood flow information desired by a viewer and further generates an image by expressing each of the pixels therein by using a color corresponding to a certain one of the calculated parameter values. In this situation, the image processing circuitry 26 calculates the various types of parameter values by using the TICs corrected by the processing circuitry 21 (explained later) and performs the parametric imaging process on the basis of the calculated parameter values.

In this situation, the image processing circuitry able to suppress registration errors (errors in position alignments) caused by movements of the subject's body to a minimum level, by using a frame taken immediately before the contrast media is administered as the mask image. Further, the image processing circuitry 26 is also capable of performing a noise reducing process by using an image processing filter such as a moving average (smoothing) filter, a Gaussian filter, a median filter, or the like. In other words, the image processing circuitry 26 is capable of performing pre-processing processes including a position misalignment correction and a noise removal on each member of a group of a plurality of X-ray images chronologically taken while using the contrast media.

The input circuitry 22 is realized by using a trackball, a switch button, a mouse, and/or a keyboard configured to set a predetermined region (e.g., a target region within the difference image on which the correcting process is to be performed). The input circuitry 22 is connected to the processing circuitry 21 and is configured to convert an input operation received from the operator into an electrical signal and to output the electrical signal to the processing circuitry 21.

The display 23 is configured to display a Graphical User Interface (GUI) used for receiving an instruction from the operator, the difference image generated by the image processing circuitry 26, the color image resulting from the parametric imaging process, and the like.

The processing circuitry 21 is configured to control operations of the entirety of the X-ray diagnosis apparatus 100 by implementing the obtaining function 211, the correcting function 212, and the controlling function 213. For example, the processing circuitry 21 performs various types of processes by reading and executing, from the storage circuitry 25, the program corresponding to the controlling function 213 configured to control the entire apparatus. For example, the processing circuitry 21 controls the dose and the turning off and on of the X-rays radiated onto the subject P, by controlling the high-voltage generator 11 according to an instruction from the operator transferred thereto from the input, circuitry 22 so as to adjust the voltage supplied to the X-ray tube 12. Further, for example, the processing circuitry 21 controls the C-arm/tabletop mechanism controlling circuitry 19 according to an instruction from the operator so as to adjust the rotating and the moving of the C-arm 15 and the moving of the tabletop 14. Further, for example, the processing circuitry 21 controls the radiation range of the X-rays radiated onto the subject P, by controlling the limiting controlling circuitry 20 according to an instruction from the operator so as to adjust the opening degree of the limiting vanes included in the collimator 13.

Further, the processing circuitry 21 controls the image data generating process performed by the image data generating circuitry 24, the image processing process performed by the image processing circuitry 26, and an analyzing process, according to an instruction from the operator. Further, the processing circuitry 21 exercises control so that the display 23 displays the GUI used for receiving an instruction from the operator and any of the images stored in the storage circuitry 25. Further, by transmitting signals to start and to end the injection of the contrast media to the injector 30, the processing circuitry 21 controls the injection timing of the contrast media. Further, the processing circuitry 21 brings the time information of the ECG received from the electrocardiograph 40 and time information of the image data generated by the image data generating circuitry 24 into correspondence with each other. Further, the obtaining function 211 and the correcting function 212 realized by the processing circuitry 21 will be explained in detail later. Further, the processing circuitry 21 is an example of the processing circuitry set forth in the claims.

The exemplary configuration of the X-ray diagnosis apparatus 100 has thus been explained. The X-ray diagnose apparatus 100 according to the first embodiment configured as described above makes it possible to understand blood flows accurately with the processes performed by the processing circuitry 21 explained in detail hereinafter. More specifically, the X-ray diagnosis apparatus 100 makes it possible to calculate more accurate parameter values by generating TICs that indicate the blood flows accurately, by eliminating impacts on the TICs made by an image of a dynamic site (e.g., the heart) overlapping with an image of a blood vessel or the like into which a contrast media flows. By performing a parametric imaging press on the basis of the parameter values calculated in this manner, the X-ray diagnosis apparatus 100 makes it possible to display a color image that accurately reflects the blood flows.

Figure 2A:
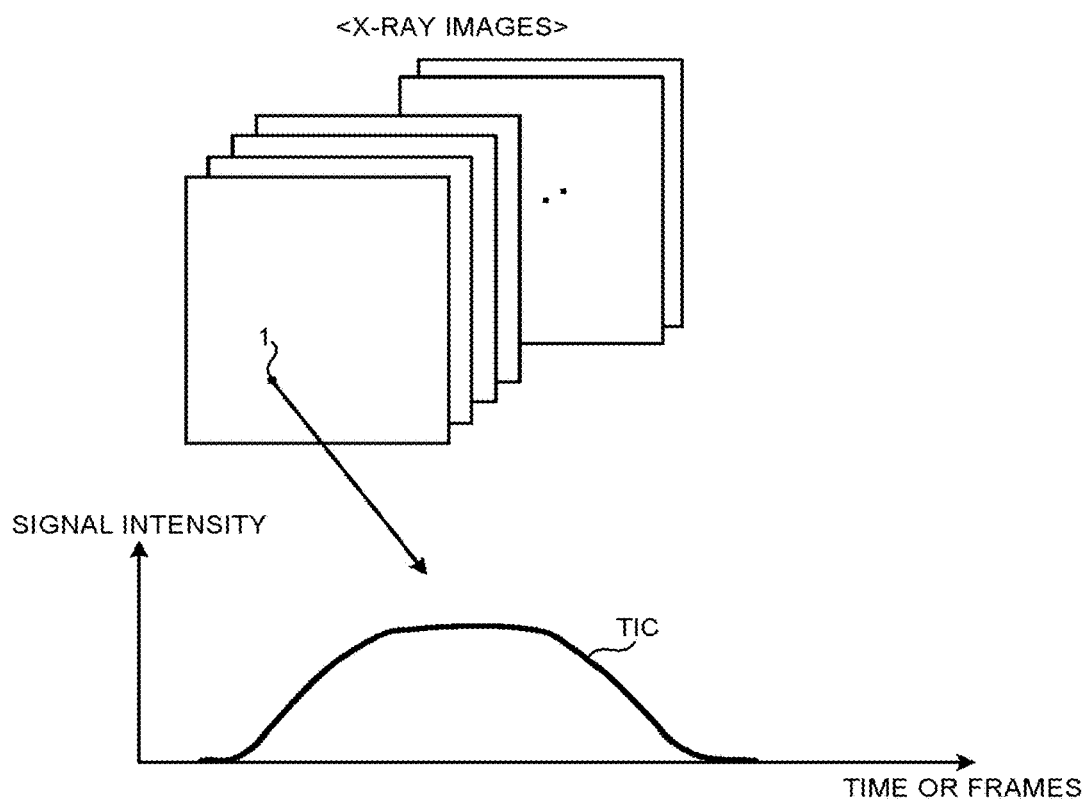
FIG. 2A is a drawing for explaining a parametric imaging process according to the first embodiment.
Figure 2B:
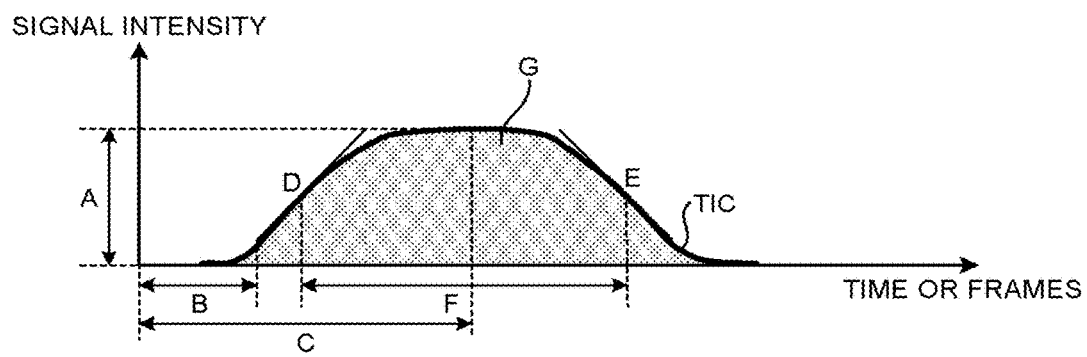
FIG. 2B is another drawing for explaining the parametric imaging process according to the first embodiment.

First, the parametric imaging process will be explained with reference to FIGS. 2A and 2B. FIGS. 2A and 2B are drawings for explaining the parametric imaging process according to the first embodiment. FIG. 2B illustrates examples of parameters used in the parametric imaging process.

As explained above, during the parametric imaging process, a Time-Intensity Curve (TIC) of the contrast media is calculated for each of the pixels, so as to calculate the various types of parameter values by using the calculated TICs. For example, as illustrated in FIG. 2A, during the parametric imaging process, the TICs are calculated for the pixels in the plurality of X-ray images (hereinafter, "contrast enhanced images") chronologically taken while using the contrast media. In other words, during the parametric imaging process, as indicated by the TIC of a pixel 1 in FIG. 2A, a TIC is calculated for each of the pixels in the contrast enhanced images, the TIC having either the imaging time or the frames of the contrast enhanced image expressed on the horizontal axis and having the signal intensity (the pixel value) expressed on the vertical axis. In the present example, the contrast enhanced images are each a difference image (a Digital Subtraction Angiography [DSA] image) obtained by eliminating background elements such as bones by performing a subtracting process (a difference calculating process) on the mask image taken while the subject has no contrast media injected therein and the contrast image taken while the subject has the contrast media injected therein.

Further, during the parametric imaging process, the parameter values are calculated for each of the pixels on the basic of the calculated TICs. For example, during the parametric imaging process, as illustrated in FIG. 2B, the following parameter values can be calculated: "A: a Peak Height (PH)" indicating a maximum value of the signal intensity; "B: Time To Arrival (TTA)" indicating the time period until the pixel starts being visibly rendered due to the contrast media; "C: Time To Peak (TTP)" indicating the time period until the signal intensity reaches the maximum value; "D: a Wash In value" indicating the time period from the time when the pixel starts being visibly rendered due to the contrast media to the time when the signal intensity reaches the maximum value; "E: a Wash Out value" indicating the time period from the point in time when the signal intensity exhibits the maximum value to the time when the contrast media finishes flowing out; "F: a Width" indicating the half value width of the maximum value of the TIC; and "G: an Area Under Curve (AUC)" indicating the area of the TIC (the amount of the contrast media that has flowed to the pixel).

In the present example, during the parametric imaging process, either the time or the frame at which the signal intensity exceeds a predetermined percentage (e.g., of the maximum value (PH) is determined as the time at which the pixel starts being visibly rendered. Also, either the time or the frame at which the signal intensity becomes lower than a predetermined percentage (e.g., 5%) of the maximum value (PH) is determined as the point in time at which the contrast media finishes flowing out. The parameter values illustrated in FIG. 2B are merely examples. Other examples of the parameter values include a "Slope" indicating the slope of the TIC to reach the maximum intensity and "Mean Transit Time (MTT)" indicating an average period of time it takes for the contrast media to pass a certain location.

When the parameter values have been calculated in this manner for each of the pixels in the contrast enhanced images, a color image in which the values of the pixels reflect a predetermined one of the parameters is generated in the parametric imaging process. For example, a color image is generated with respect to the parameter "TTA" indicating the time when each of the pixels starts being visibly rendered due to the contrast media. In this situation, color information is assigned to the frames (or the times) contained in the contrast enhanced images, so as to generate the color image in which each of the pixels reflects a color corresponding to the frame (or the time) at which the pixel starts being visibly rendered due to the contrast media. As a result, the viewer is able to observe, at a glance, the state of the blood flows from the color information of the color image.

Figure 3A:
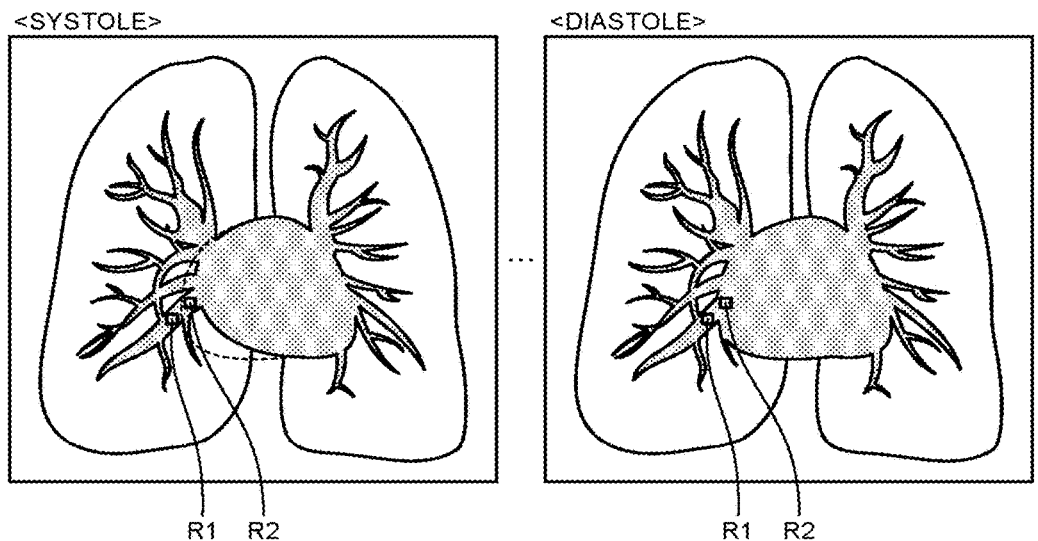
FIG. 3A is a drawing for explaining a problem of a conventional technique.
Figure 3B:
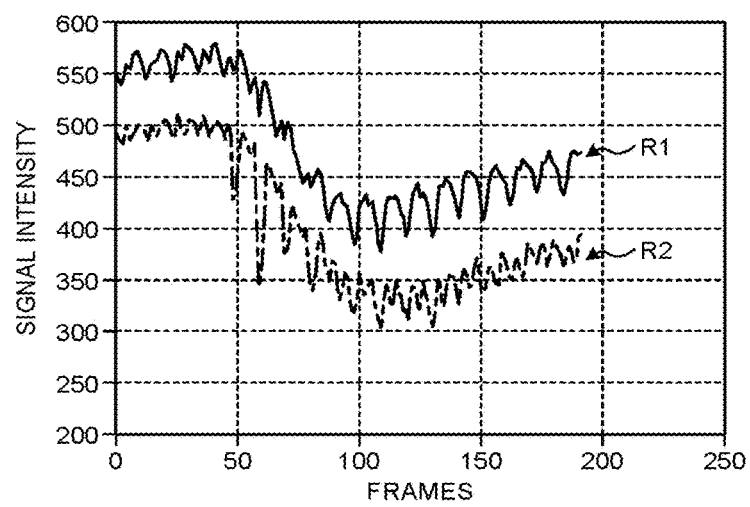
FIG. 3B is another drawing for explaining the problem of the conventional technique.
Figure 3C:
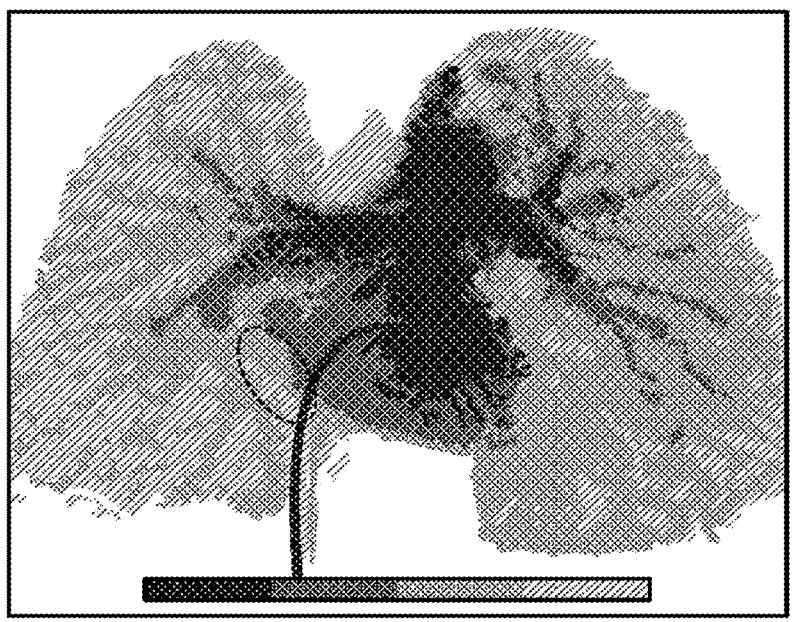
FIG. 3C is yet another drawing for explaining the problem of the conventional technique.

As explained above, during the parametric imaging process, the color image is generated and displayed on the basis of the TIC calculated for each of the pixels. According to a conventional parametric imaging process, however, there are some situations where color images fail to indicate accurate blood flow information because TICs in a blood vessel region are impacted by a dynamic site. FIGS. 3A to 3C are drawings for explaining a problem of the conventional technique. For example, as illustrated in FIG. 3A, when a contrast enhanced image of both of the pulmonary arteries is taken for the purpose of checking an embolization state of the pulmonary arteries, the TICs of the blood vessels may be affected because an image of a blood vessel and an image of the heart overlap with each other in the depth direction when the heart expands during diastole.

In one example, in FIG. 3A, regions R1 and R2 are both positioned over the image of the pulmonary artery. As illustrated in FIG. 3A, the region R1 does not overlap with the image of the heart either during systole or during diastole. In contrast, the region R2 overlaps with the image of the heart in the depth direction when the heart expands during diastole. In other words, the TICs of the pixels contained in the region R1 are generated only from the signals based on the contrast media flowing through the blood vessel in the region R1. In contrast, the TICs of the pixels contained in the region R2 are generated from the signals based on the contrast media flowing through the blood vessel in the region R2 and the signals based on the contrast media in the heart corresponding to every time when the heart expands.

FIG. 3B illustrates TICs of the regions R1 and R2. In the chart in FIG. 3B, the vertical axis expresses the signal intensity (the pixel value), whereas the horizontal axis expresses frames. Further, the TICs in FIG. 3B express the brightness values without any modifications and are each a TIC expressed in such a manner that the signal intensity (the brightness value) becomes lower (becomes darker) when the pixel is visibly rendered by the contrast media. In other words, the TICs in FIG. 3B are displayed as an inversion of the TICs displayed in FIGS. 2A and 2E. For example, as illustrated in FIG. 3B, the TIC for the region R1 is generated only from the signals based on the contrast media flowing through the blood vessel, and none of the signal intensity values diverges from (significantly differs from) the signal intensity value of an adjacently-positioned signal.

In contrast, as illustrated in FIG. 3B, the TIC for the region R2 contains a number of spike-shaped signals near frames "50 to 80". These signals are based on the contrast media in the heart of which the image overlaps with the region R every time the heart expands and are considered as unnecessary signals. When TICS contain such signals, the calculated parameter values are inaccurate, and it may be difficult to accurately understand the blood flows. For example, when a parametric imaging process is performed by using the parameter "TTA", a color image is generated on the basis of differences in the frame (the time) at which the pixel starts being visibly rendered due to the contrast media. Because "TTA" indicates the frame (the time) at which the signal intensity exceeds the predetermined percentage (e.g., 5%) of the maximum value (PH), when spike-shaped signals such as hose in the TIC for the region R2 are contained, it becomes impossible t accurately calculate the "ITA" values.

For example, in the TIC for the region R2 illustrated in FIG. 3B, the "PH" is exhibited near frame "110". In this situation, when spike-shaped signals such as those in the TIC for the region R2 are contained, the frames (near frame "50", for example) having the spike-shaped signals are considered as the frames in which the signal intensities exceed the predetermined percentage of the "PH" level. In this manner, the frames that are different from the frames actually exceeding the predetermined percentage of the "PH" level are selected, and erroneous "TTA" values may be calculated.

When a parametric imaging process is performed by using such erroneous "TTA" values, it would be difficult to accurately understand the blood flows, and an impact might be made on the diagnosis process. For example, when a diagnosis is to be made on an embolization state of the pulmonary arteries, there is a possibility that the manners in which the blood vessels are visibly rendered may be different between the left lung and the right lung. FIG. 3C illustrates a color image obtained by performing a parametric image process on the pulmonary arteries by using the parameter "TTA". For example, there may be some situations where it is difficult to accurately understand the state of the blood flows in the region (the region where an image of the right ventricle overlaps due to the expansion of the heart) indicated with the dotted oval in FIG. 3C or the like.

To cope with these situations, the X-ray diagnosis apparatus 100 according to the present disclosure is configured so as to calculate more accurate parameter values, by generating TICs that indicate blood flows accurately by performing a correcting process to eliminate impacts on the TICs that are made by an image of a dynamic site (e.g., the heart) overlapping with an image of a blood vessel into which a contrast media flows. Details of the correcting process performed by the X-ray diagnosis apparatus 100 of the present disclosure will be explained below.

The obtaining function 211 is configured to obtain a chronological transition of signal intensities for each of the pixels in the plurality of X-ray images (the contrast enhanced images) chronologically acquired while using the contrast media. More specifically, the obtaining function 211 obtains a TIC of each of the pixels in the plurality of chronological contrast enhanced images generated by the image processing circuitry 26. In other words, the obtaining function 211 obtains pixel values of pixels in mutually-the-same position, with respect to each of the pixels in the plurality of chronological contrast enhanced images and further generates a TIC plotting the obtained pixel values for each of the pixels. In this situation, the TICs obtained by the obtaining function 211 include, for example, one or more TICs containing spike-shaped signals such as those illustrated in FIG. 3B.

The correcting function 212 is configured to correct the chronological transition of the signal intensities, on the basis of a level of similarity between at least two mutually-different signal intensities within the chronological transition of the signal intensities. More specifically, on the basis of the signal intensity of a signal that is positioned adjacent in the time series within the chronological transition of the signal intensities, the correcting function 212 corrects the chronological transition of the signal intensities so as to eliminate the signal intensity value of a divergence signal (i.e., the signal that has a value having a low level of similarity with the signal intensity value of the adjacently-positioned signal) that has a value diverging from the signal intensity value of the adjacently-positioned signal. More specifically, the correcting function 212 performs the correcting process so as to eliminate the divergence signal (e.g., a spike-shaped signal) of which the signal intensity value significantly differs from the signal intensity value of a surrounding signal thereof, with respect to the TICs of the pixels obtained by the obtaining function 211.

Figure 4A:
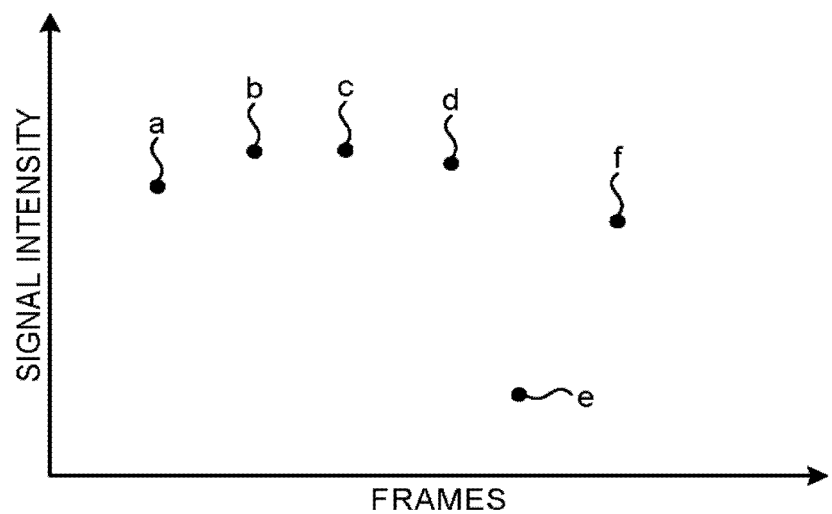
FIG. 4A is a drawing for explaining an example of a correcting process performed by a correcting function according to the first embodiment.
Figure 4B:
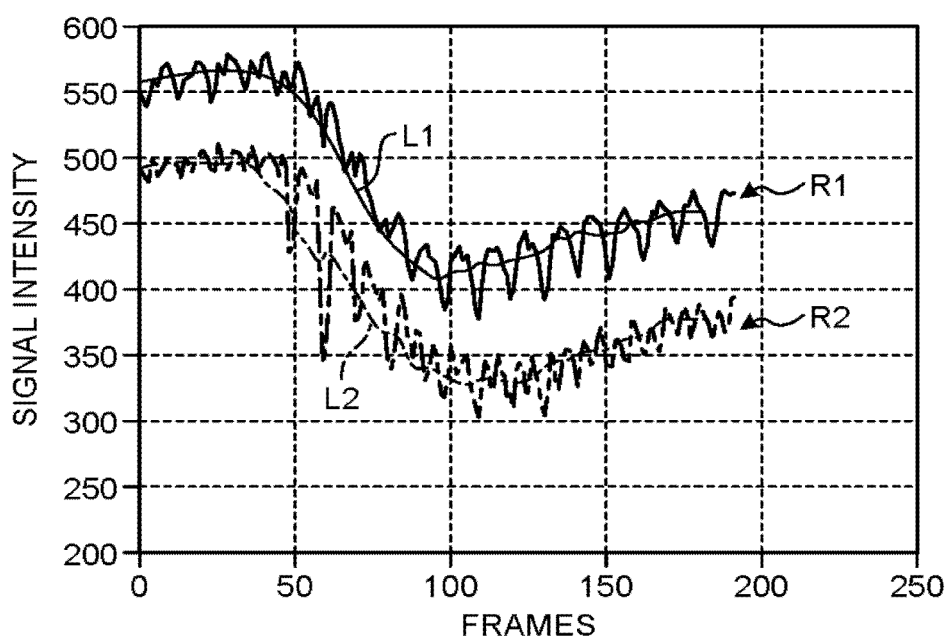
FIG. 4B is another drawing for explaining the example of the correcting process performed by the correcting function according to the first embodiment.

For example, the correcting function 212 corrects the chronological transition of the signal intensities by replacing the signal intensity value of each of the signals with a value based on signal intensity values of a predetermined number of signals that are continuous, in the time series, with the signal subject to the replacement. In one example, the correcting function 212 corrects each of the TICs by using an average value calculated from the signal intensity value of the divergence signal and the signal intensity values of a predetermined number of signals that are continuous therewith in the time series, as a signal intensity value of the divergence signal. In other words, the correcting function 212 performs the correcting process for each of the signals in the TICs obtained by the obtaining function 211, by calculating an average value from the signal and the predetermined number of continuous signals and replacing the signal intensity value with the calculated average value. In other words, by performing the smoothing process on each of the TICs, the correcting function 212 eliminates the divergence signals contained in the TICs. FIGS. 4A and 4B are drawings for explaining an example of the correcting process performed by the correcting function 212 according to the first embodiment. In the present example, FIGS. 4A and 4B illustrate processes performed on a TIC obtained by the obtaining function 211. Although FIG. 4A illustrates only six signals for the convenience in the explanation, the chart in actuality plots signals corresponding to a number of frames.

For example, the correcting function 212 replaces the value of the signal "e" exhibiting a spike shape in the TIC with an average value calculated from the value thereof and the value of other signals that are continuous therewith in the time series. In one example, the correcting function calculates an average value by using the values of the signals "a" to "d" corresponding to the four frames preceding the frame of the signal "e" together with the value of the signal "e". After that, the correcting function 212 eliminates the spike-shaped signal "e" by replacing the value of the signal "e" with the calculated average value. In this situation, the averaging process described above may be performed not only on one or more divergence signals each exhibiting a spike shape, but also on all the signals. In other words, the correcting function 212 may replace the value in each of the frames with an average value, by using the values in a predetermined number of frames that are continuous therewith. For example, the correcting function 212 replaces the value of the signal "a" illustrated in FIG. 4A with an average value calculated by using therewith the signal intensity values of the signals corresponding to the four frames preceding the frame of the signal "a". Similarly, the correcting function 212 replaces the value of each of the signals "b", "c", "d", and "f" with an average value calculated by using the value of the signal together with the values of the signals corresponding to the four frames preceding the signal.

In the description above, the example is explained in which the average value is calculated by using the five frames; however, possible embodiments are not limited to this example. The number of frames to be used in the averaging process may arbitrarily be determined. For example, the number of frames may be set on the basis of an acquisition rate (a frame rate) used for acquiring the contrast enhanced images and the image taking target site of the contrast enhanced images. Further, in the description above, the example is explained in which the signal value is averaged together with the values corresponding to the preceding four frames in the time series; however, possible embodiments are not limited to this example. The frames to be used in the averaging process may arbitrarily be determined. For example, the signal value may be averaged together with the signal intensity values of the two frames preceding and following the frame subject to the replacement.

By performing the averaging process described above on each of all the signals in the TICs, for example, it is possible to correct the TICs into TICs each shaped as a curved line, as illustrated in FIG. 4B, from which the spike-shaped divergence signals are eliminated. For example, as illustrated in FIG. 4B, the correcting function 212 corrects the TIC for the region R1 into a curved line L1. Further, as illustrated in FIG. 4B, the correcting function 212 corrects the TIC for the region R2 into a curved line L2. As a result, it is possible to generate the TICs that more accurately reflect the state of the blood flows. Consequently, it is possible to understand the state of the blood flows more accurately by performing a parametric imaging process while using the generated TICs.

The averaging process described above may use an arbitrary average value such as an arithmetic mean, a geometric mean, or a mean-square value, for example. Further, when replacing the signal intensity value of each of the signals with a value based on the signal intensity values of the predetermined number of signals that are continuous, in the time series, with the signal subject to the replacement, it is also acceptable to use not only the average value described above, but also, for example, a median value or a mode value of the signal intensity values of the predetermined number of signals that are continuous, in the time series, with the signal subject to the replacement.

In the description above, the example is explained in which the correcting process is performed by averaging the signal intensity values; however, the correcting function 212 according to the first embodiment is also capable of performing other correcting processes. For example, the correcting function 212 may correct the chronological transition of the signal intensities by determining such a signal that has a value of which the difference from the signal intensity value of an adjacently-positioned signal exceeds a predetermined threshold value as a divergence signal and thinning out the signals by excluding the divergence signal. To continue the explanation with reference to FIG. 4A, for example, the correcting function 212 calculates the difference between the signal "a" and the signal "b" and further compares the calculated difference with a predetermined threshold value. After that, the correcting function 212 calculates the difference between the signal "b" and the signal "c" and further compares the calculated difference with the predetermined threshold value. Thus, when the difference between the signals "a" and "b" and the difference between the signals "b" and "c" both exceed the predetermined threshold value, the correcting function 212 determines the signal "b" as a divergence signal. After that, the correcting function 212 corrects the TIC by thinning out the signals by excluding the signal "b" determined as a divergence signal from the TIC. In this situation, the predetermined threshold value used for determining the divergence signal may arbitrarily be set by the user.

Figure 5:
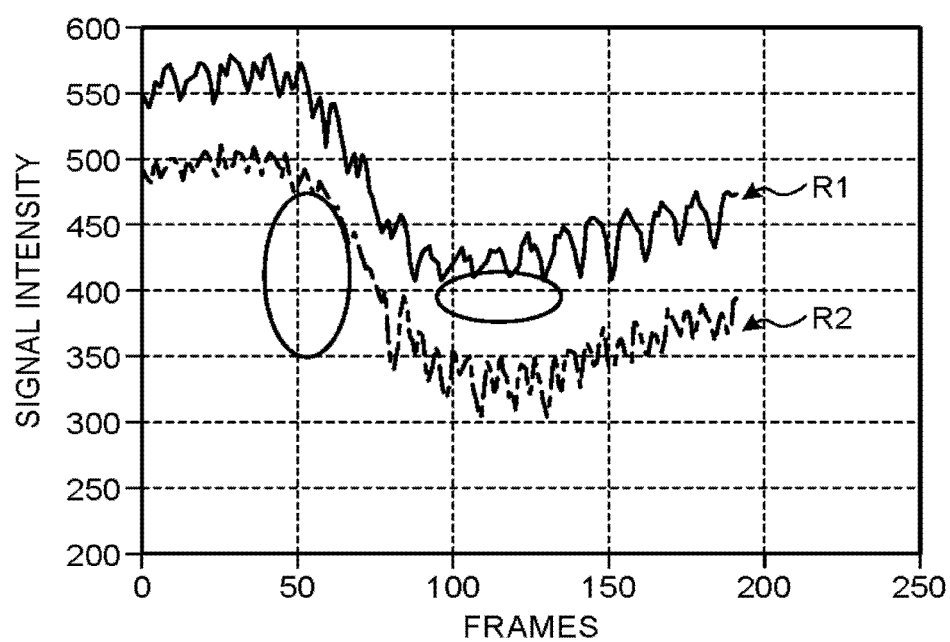
FIG. 5 is a drawing for explaining another example of the correcting process performed by the correcting function according to the first embodiment.

By performing the thinning-out process described above, for example, the correcting function 212 is able to correct the original TIC into a TIC from which the spike-shaped divergence signals are eliminated, as indicated in the area near the ovals in FIG. 5. In the present example, as indicated by the TIC for the region R1, by performing the thinning-out process described above, it is possible to eliminate not only the spike-shaped divergence signals caused by the dynamic site, but also divergence signals brought out by other causes (e.g., a part where an image of a blood vessel overlaps with an image of a pulmonary artery by three-dimensionally intersecting therewith). FIG. 5 is a drawing for explaining the example of the correcting process performed by the correcting function according to the first embodiment.

Further, it is also acceptable to use the averaging process and the thinning-out process described above in combination. For example, the correcting function 212, at first, eliminates divergence signals exhibiting significantly-diverging values by performing the thinning-out process and subsequently performs the averaging process. With this arrangement, the correcting function 212 is able to reduce the impact made on the average value by the divergence signals. Alternatively, for example, the correcting function 212 may determine the divergence signals in the same manner as in the thinning-out process and may subsequently perform the averaging process on the divergence signals without thinning out the signals.

Further, for example, the correcting function 212 may perform a single correcting process in which an averaging process and a thinning-out process are combined together. In that situation, the correcting function 212 corrects the chronological transition of the signal intensities, by replacing the signal intensity value of each of the signals with an average value calculated from the signal intensity values of a predetermined number of signals that are continuous, in the time series, with the signal subject to the replacement and subsequently determining, while using the average values after the replacement, such a signal that has a value of which the difference from an adjacently-positioned average value exceeds a predetermined threshold value as a divergence signal, and further thinning out the signals by excluding the divergence signal. For example, at first, as illustrated in FIG. 4B, the correcting function 212 corrects the TIC into a TIC of average values, by performing the averaging process on each of all the signals in the TIC. After that, the correcting function 212 compares the values of the signals (the original signals) in the pre-averaging-process TIC with the values of the signals in the TIC of average values and subsequently determines any of the original signals exceeding a predetermined threshold value as divergence signals, before further performing a thinning-out process. In this situation, the predetermined threshold value used for determining the divergence signals may arbitrarily be set by the user.

In the thinning-out process described above, the example is explained in which the values of the divergence signals are eliminated; however, possible embodiments are not limited to this example. For instance, it is acceptable to eliminate the values of the divergence signals and to provide another predetermined value as a value corresponding to each of the frames from which the values were eliminated. For example, the correcting function 212 provides an average value of the preceding and the following frames in e time series as the value in the frame from which the value was excluded in the thinning-out process. With this arrangement, it is possible to generate a TIC having values in all the frames even after the thinning-out process is performed. It is therefore possible to calculate more accurate parameter values.

Figure 6:
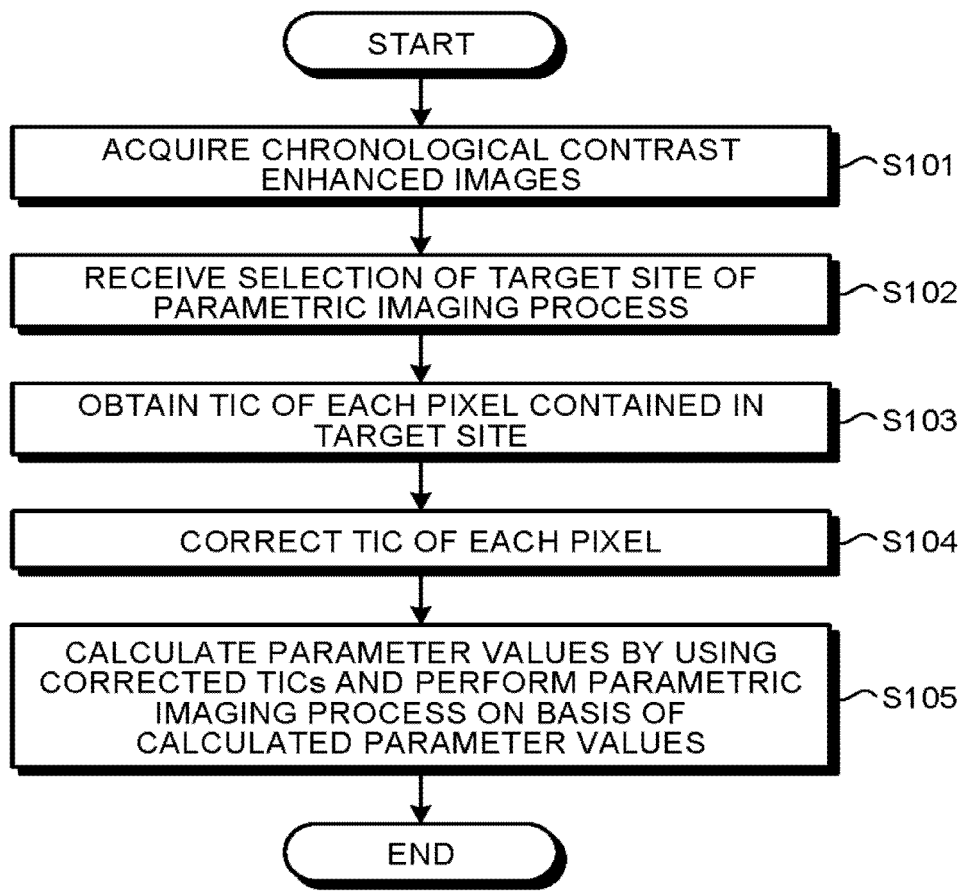
FIG. 6 is a flowchart of a procedure in a process performed by the X-ray diagnosis apparatus according to the first embodiment.

Next, a process performed by the X-ray diagnosis apparatus 100 according to the first embodiment will be explained, with reference to FIG. 6. FIG. 6 is a flowchart of a procedure in a process performed by the X-ray diagnosis apparatus 100 according to the first embodiment. Step S101 in FIG. 6 is a step executed by the processing circuitry 21 by reading the program corresponding to the controlling function 213 from the storage circuitry 25. At step S101, when the operator has pressed an image taking switch, the processing circuitry 21 acquires chronological contrast enhanced images by controlling the various circuits and the injector 30.

Step S102 is a step executed by the input, circuitry 22. At step S102, the input circuitry 22 receives, from the operator, an operation to select a target site of a parametric imaging process. For example, the operator operates a mouse or a pointer so as to select a target site within a contrast enhanced image. Another arrangement is also acceptable in which no target site is selected from the contrast enhanced images, but the entire contrast enhanced images are used as a target of the parametric imaging process.

Step S103 is a step executed by the processing circuitry 21 by reading the program corresponding to the obtaining function 211 from the storage circuitry 25. At step S103, the processing circuitry 21 obtains a TIC of each of the pixels contained in the target site. Step S104 is a step executed by the processing circuitry 21 by reading the program corresponding to the correcting function 272 from the storage circuitry 25. At step S104, the processing circuitry 21 corrects the TIC of each of the pixels, by performing at least one selected from the averaging process and the thinning-out process.

Step S105 is a step executed by the image processing circuitry 26 by reading the program corresponding to the image processing process from the storage circuitry 25. At step S105, the image processing circuitry 26 calculates parameter values by using the corrected TICs and performs the parametric imaging process on the basis of the calculated parameter values.

As explained above, according to the first embodiment, the obtaining function 211 is configured to obtain the chronological transition of the signal intensities, for each of the pixels in the plurality of X-ray images chronologically acquired by using the contrast media. The correcting function 212 is configured to correct the chronological transition of the signal intensities so as to eliminate the signal intensity values of the divergence signals each having a value diverging from the signal intensity value of an adjacently-positioned signal, on the basis of the signal intensity of the signal that is positioned adjacent in the time series within the chronological transition of the signal intensities. Consequently, the X-ray diagnosis apparatus 100 according to the first embodiment is able to generate the TICs from which the values of divergence signals are eliminated and thus makes it possible to understand the state of the blood flows more accurately by performing the parametric imaging process more accurately. For example, even with the site where an image of the heart or another blood vessel overlaps with an image of a pulmonary artery, the X-ray diagnosis apparatus 100 is able to present accurate blood flow information by eliminating the impact thereof.

Further, according to the first embodiment, the correcting function 212 is configured to correct the chronological transition of the signal intensities, by using the average value calculated from the signal intensity value of the divergence signal and the signal intensity values of the predetermined number of signals that are continuous therewith in the time series as a signal intensity value of the divergence signal. Consequently, the X-ray diagnosis apparatus 100 according to the first embodiment makes it possible to efficiently eliminate the values of the divergence signals. For example, the X-ray diagnosis apparatus 100 is able to easily eliminate the impact of the divergence signals, without taking the trouble of performing a parametric imaging process while eliminating the frame corresponding to the point in time when the image of the heart overlaps. Further, the X-ray diagnosis apparatus 100 is able to acquire the contrast enhanced images in a shorter period of time and to thus reduce the amount of contrast media being used, because there is no need to extend the time period for the contrast enhanced image acquiring process due to the parametric imaging process performed while eliminating the frame corresponding to the point in time when the image of the heart overlaps.

Further, according to the first embodiment, the correcting function 212 corrects the chronological transition of the signal intensities, by replacing the signal intensity value of each of the signals with the average value calculated from the signal intensity values of the predetermined number of signals that are continuous, in the time series, with the signal subject to the replacement and subsequently determining, while using the average values after the replacement, such a signal that has a value of which the difference from an adjacently-positioned average value exceeds the predetermined threshold value as a divergence signal, and further thinning out the signals by excluding the divergence signal. Consequently, the X-ray diagnosis apparatus 100 according to the first embodiment makes it possible to perform the thinning-out process by determining the divergence signals on the basis of a tendency of the transition of signal intensities.

In addition, according to the first embodiment, the correcting function 212 corrects the chronological transition of the signal intensities, by determining such a signal that has a value of which the difference from the signal intensity value of an adjacently-positioned signal exceeds the threshold value as a divergence signal and further thinning out the signals by excluding the divergence signal. Consequently, the X-ray diagnosis apparatus 100 according to the first embodiment makes it possible to easily thin out the signals by excluding the divergence signal.

Furthermore, according to the first embodiment, the number of frames used in the averaging process is set on the basis of the frame rate used for acquiring the plurality of X-ray images and the image taking target site of the plurality of X-ray images. Consequently, the X-ray diagnosis apparatus 100 according to the first embodiment makes it possible to perform an optimal averaging process in accordance with the circumstances.

Second Embodiment

In the embodiment described above, the example is explained in which the thinning-out process is performed by determining each of the divergence signals on the basis of either the difference from the signal intensity of the signal positioned adjacent thereto in the time series or the difference from the average value. In a second embodiment, an example will be explained in which a thinning-out process is performed on the basis of slopes calculated from signal intensities. The X-ray diagnosis apparatus 100 according to the second embodiment is different from the X-ray diagnosis apparatus 100 according to the first embodiment for the contents of the processes performed by the correcting function 212. The differences will be explained below.

The correcting function 212 according to the second embodiment is configured to correct the chronological transition of the signal intensities, by calculating slopes based on the signal intensity values of two adjacently-positioned signals, comparing each of the calculated slopes with the preceding and following slopes thereof in the time series, determining such a signal that is included in a slope of which the differences from the preceding and following slopes both exceed a predetermined threshold value as a divergence signal, and further thinning out the signals by excluding the divergence signal. More specifically, the correcting function 212 determines the divergence signal by calculating the slopes of the line segments connecting the adjacently-positioned signals thereto and comparing the calculated slopes with one another. In this situation, the correcting function 212 compares each of the slopes with the preceding and following slopes thereof in the time series. In other words, the correcting function 212 detects such slope that significantly deviates from the transition of signal intensities by comparing the slope with the preceding and following slopes thereof in the time series and determines the signal included in the detected slope as the divergence signal. In this situation, the predetermined threshold value used in the determining process may arbitrarily be set by the user.

Figure 7A:
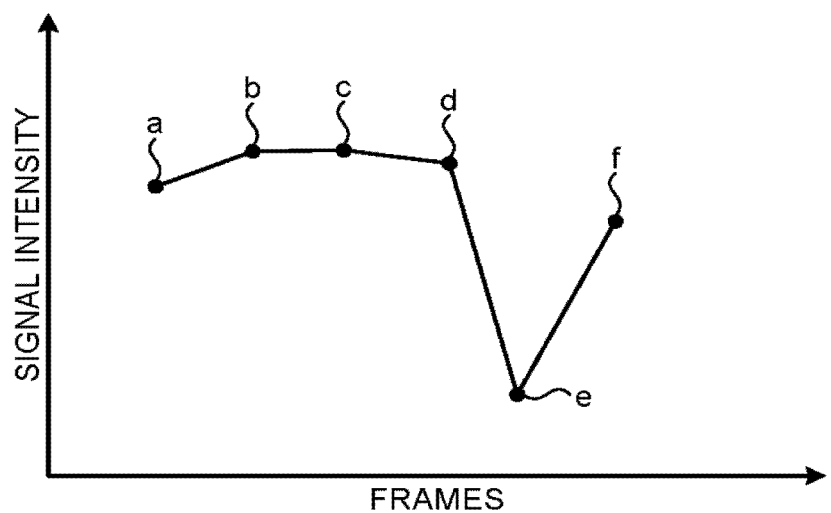
FIG. 7A is a drawing for explaining an example of a correcting process performed by a correcting function according to a second embodiment.
Figure 7B:
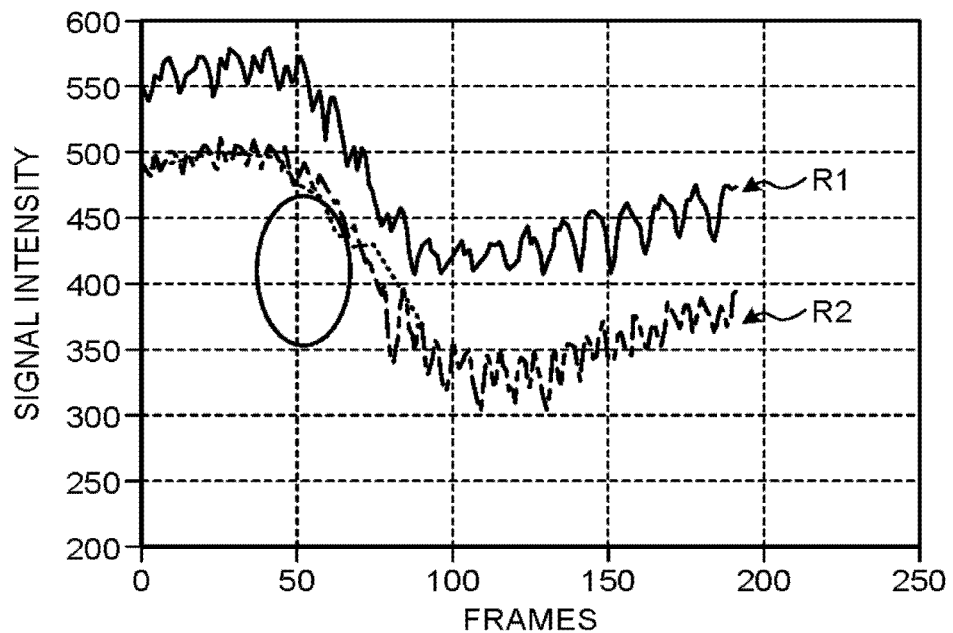
FIG. 7B is another drawing for explaining the example of the correcting process performed by the correcting function according to the second embodiment.

FIGS. 7A and 7B are drawings for explaining an example of a correcting process performed by the correcting function according to the second embodiment. FIGS. 7A and 7B illustrate a process performed on a TIC obtained by the obtaining function 211. Although FIG. 7A illustrates only six signals for the convenience in the explanation, the chart in actuality blots signals corresponding to a number of frames.

For example, as illustrated in FIG. 7A, the correcting function 212 determines a divergence signal by connecting the signals "a" to "f" with straight lines and comparing the slopes of the line segments between the signals with one another. In one example, to judge whether the signal "c" is a divergence signal or not, the correcting function 212 compares the slope of the line segment "b-c" with the slope of the line segment "a-b" and with the slope of the line segment "c-d" and, when both of the differences between the slopes exceed a predetermined threshold value, the correcting function 212 determines that the signal "c" is a divergence signal. In other words, when the slope of the line segment "b-c" is significantly different from the slope of the line segment "a-b" and the slope of the line segment "c-d" that precede and follow the slope subject to the judgment in the time series, the correcting function 212 determines that the signal is a divergence signal.

The correcting function 212 sequentially performs the divergence signal determining process using the slopes described above, for each of the signals in the TIC. For example, when having finished the judging process on the signal "c" described above, the correcting function 212 subsequently judges whether the signal "d" is a divergence signal or not. In other words, the correcting function 212 compares the slope of the line segment "c-d" with the slope of the line segment "b-c" and with the slope of the line segment "d-e". In the present example, although the difference between the slope of the line segment "c-d" and the slope of the line segment "d-e" exceeds the predetermined threshold value, because the difference between the slope of the line segment "c-d" and the slope of the line segment "b-c" does not exceed the predetermined threshold value, the correcting function 212 determines that the signal "d" is not a divergence signal.

Similarly, to judge whether the signal "e" is a divergence signal or not, because the difference between the slope of the line segment "d-e" and the slope of the line segment "c-d" exceeds the predetermined threshold value, while the difference between the slope of the line segment "d-e" and the slope of the line segment "e-f" exceeds the predetermined threshold value, the correcting function 212 determines that the signal "e" is a divergence signal. When having performed the divergence signal determining process described above on each of the signals in the TIC, the correcting function 212 performs the thinning-out process of thinning out the signals by excluding the divergence signals. As a result, as illustrated in FIG. 7B, for example, the correcting function 212 is able to correct the original TIC into a TIC from which the spike-shaped divergence signals are eliminated.

Further, the thinning-out process using the slopes described above may be performed in combination with the averaging process as appropriate, similarly to the thinning-out process explained in the first embodiment. Further, in the same maim as in the first embodiment, it is also acceptable to eliminate the values of the divergence signals by performing the thinning-out process using the slopes described above and to subsequently provide another predetermined value as a value in each of the frames from which the values were eliminated.

As explained above, according to the second embodiment, the correcting function 212 is configured to correct the chronological transition of the signal intensities, by calculating the slopes based on the signal intensity values of the two adjacently-positioned signals, comparing each of calculated slopes with the preceding and following slopes thereof in the time series, determining such a signal that is included in a slope of which the differences from the preceding and following slopes both exceed the predetermined threshold value as a divergence signal, and further thinning out the signals by excluding the divergence signal. Consequently, the X-ray diagnosis apparatus 100 according to the second embodiment makes it possible to determine the divergence signals on the basis of a tendency of the transition of the signal intensities.

Third Embodiment

In the embodiments described above, the examples are explained in which the correcting process is performed on each of all the pixels contained in the target site of the parametric images process. In a third embodiment, an example will be explained in which, within the target site of the parametric imaging process, a correcting process is performed only on the pixels contained in a region where divergence signals may occur (e.g., a region where an image of the heart overlaps when the heard expands). The X-ray diagnosis apparatus 100 according to the third embodiment is different from the X-ray diagnosis apparatus 100 according to the first embodiment for the contents of the processes performed by the correcting function 212. The differences will be explained below.

Figure 8:
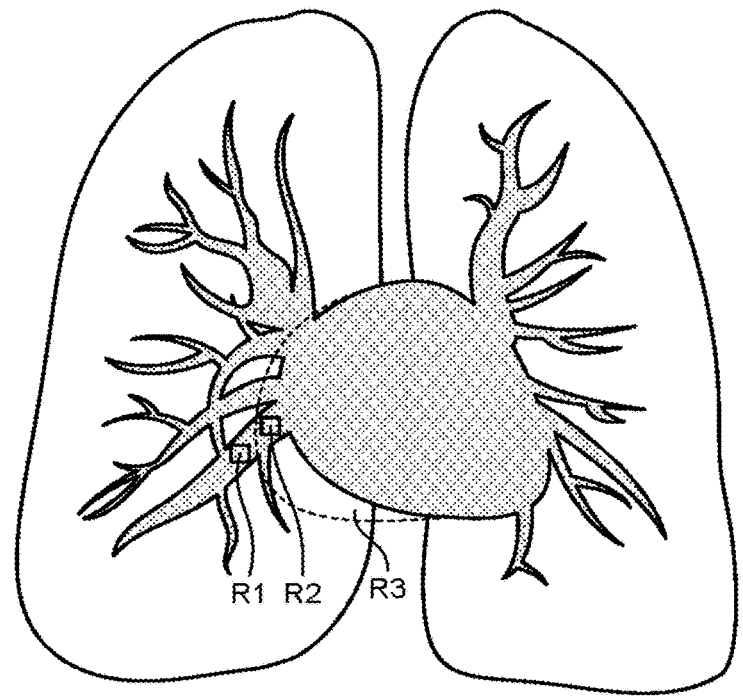
FIG. 8 is a drawing for explaining a target region of a correcting process performed by a correcting function according to a third embodiment.

The correcting function according to the third embodiment is configured to correct the chronological transition of the signal intensities of each of the pixels contained in a region where an image of a dynamic site overlaps within the plurality of X-ray images. FIG. 8 is a drawing for explaining a target region of a correcting process performed by the correcting function 212 according to the third embodiment. For example, the correcting function 212 performs the correcting process only on the TICs of the pixels contained in a region R3 illustrated in FIG. 9. In other words, the correcting function 212 performs the correcting process described above on each of the pixels contained in the region R3, which is a region where the image of the heart does not overlap during systole, but the image of the heart overlaps during diastole.

In this situation, the region R3 may automatically be extracted or may be designated by the user. For example, the correcting function 212 may extract the heart region from each of the plurality of chronological contrast enhanced images, by using an existing segmentation technique or an existing contour tracking technique and may further extract the region R3 from the extracted heart region. Alternatively, the correcting function 212 may obtain information about the region R3 designated by the user by operating a mouse or the like. The correcting function 212 extracts the pixels contained in either the extracted region R3 or the obtained region R3 and performs the correcting process only on the TICs of the extracted pixels.

Figure 9:
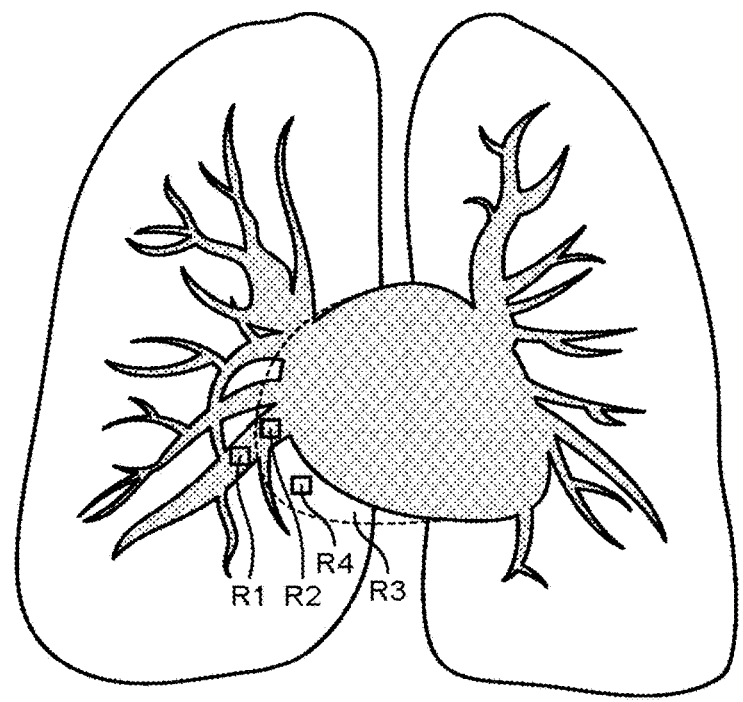
FIG. 9 is a drawing for explaining an example of the correcting process performed by the correcting function according to the third embodiment.

In addition, the correcting function 212 is also capable of further correcting TICs by using a plurality of contrast enhanced regions. More specifically, by calculating the difference in signal intensity values of the pixels between at least two mutually-different contrast enhanced regions within the plurality of X-ray images, the correcting function 212 corrects a chronological transition of signal intensities of the pixels in at least one of the contrast enhanced regions. In the following sections, a correcting process using the information about the region R3 will be explained as an example of the process. For example, the correcting function 212 according to the third embodiment corrects the chronological transition of the signal intensities of the pixels in a contrast enhanced region, by subtracting the signal intensity value of a pixel in a non-contrast-enhanced region where an image of a dynamic site overlaps, from the signal intensity value of a pixel in a contrast enhanced region where the image of the dynamic site overlaps, within the plurality of X-ray images. In one example, the correcting function 212 performs the correcting process the TICs in the contrast enhanced region, by obtaining the TICs of the non-contrast-enhanced region included in the region R3 and subtracting the TICs of the non-contrast-enhanced region from the TICs of the contrast enhanced region contained in the region R3. FIG. 9 is a drawing for explaining an example of the correcting process performed by the correcting function 212 according to the third embodiment. For example, the correcting function 212 corrects the TICs of the region R2 by subtracting the TICs of a region R4 from the TICs of the region R2 illustrated in FIG. 9. In other words, in region R3 which is a region where divergence signals may occur, the correcting function 212 eliminates only the divergence signals by subtracting the TICs of the region R4, which is a non-contrast-enhanced region, from the TICs of the region R2, which is a contrast enhanced region (e.g., a blood vessel region).

The region R3 is a region where an image of the heart overlaps when the heart expands during diastole. Accordingly, the TICs of the region R2 and the region R4 included in the region R3 each contain divergence signals. In the present example, because the region R4 is a non-contrast-enhanced region, the TICs of the region R4 contain no signals based on the contrast media and contain only the divergence signals. In other words, it is possible to eliminate only the divergence signals, by subtracting the TICs of the region R4 from the TICs of the region R2 containing the signals based on the contrast media flowing into the blood vessels and the divergence signals.

In this situation, when the TICs of the region R4 are subtracted from the TICs of the region R2, the subtracting process may be performed on all the signals or may be performed locally. In other words, the correcting function 212 may perform the subtracting process on all the signals by performing the subtracting process between corresponding frames from the TICs of the region R2 and the TICs of the region R4. Alternatively, the correcting function 212 may determine the divergence signals contained in the TICs of the region R4 and extract the values of the determined divergence signals. After that, the correcting function 212 determines the divergence signals contained in the TICs of the region and performs the subtracting process locally by subtracting the values of the divergence signals in the TICs of the region R4 from the values of the determined divergence signals.

The no contrast-enhanced region in the region R3 may automatically be extracted or may be designated by the user. For example, from the TICs of the pixels contained in the region R3, the correcting function 212 may extract such pixels of which the TICs include no fluctuation of signal intensities caused by the contrast media as the non-contrast-enhanced region. Alternatively, the correcting function 212 may obtain information about the region R4 designated by the user by operating a mouse or the like. Further, although FIG. 9 illustrates only the single non-contrast-enhanced region (only the region R4), the number of non-contrast-enhanced regions may arbitrarily be set. For example, when there are two or more non-contrast-enhanced regions, the correcting function 212 may perform the subtracting process described above by using a TIC obtained by averaging the TICs of the non-contrast-enhanced regions.

The subtracting process described above is merely an example, and possible embodiments are not limited to this example. For instance, when images of two blood vessels overlap with each other in the depth direction, the subtracting process described above may be performed on contrast enhanced regions of which the contrast is enhanced with a time difference therebetween. In that situation, for example, the correcting function 212 corrects the TICs of the contrast enhanced region where the images of the two blood vessels overlap with each other, by subtracting the TICs of the contrast enhanced region where the images of the blood vessels do not overlap with each other, from the TICs of the contrast enhanced region where the images of the two blood vessels overlap with each other. In this situation, for example, the correcting function 21 corrects a TIC of the contrast enhanced region where the images of the two blood vessels overlap with each other, by performing the subtracting process after arranging a TIC of the contrast enhanced region where the images of the blood vessels do not overlap with each other so as to be aligned with either the rising end (the part where the pixel value starts increasing due to the inflow of the contrast media in FIGS. 2A and 2B) of the TIC of the contrast enhanced region where the images of the two blood vessels overlap with each other or the trailing end (the part where the pixel value starts decreasing due to the outflow of the contrast media in FIGS. 2A and 2B) of the TIC of the contrast enhanced region where the images of the two blood vessels overlap with each other.

Next, a process performed by the X-ray diagnosis apparatus 100 according to the third embodiment will be explained with reference to FIG. 1C. FIG. 10 is a flowchart of a procedure in a process performed by the X-ray diagnosis apparatus 100 according to the third embodiment. Step S201 illustrated in FIG. 10 is a step executed by the processing circuitry 21 by reading the program corresponding to the controlling function 213 from the storage circuitry 5. At step S201, when the operator has pressed an image taking switch, the processing circuitry 21 acquires chronological contrast enhanced images by controlling the various circuit and the injector 30.

Step S202 is a step executed by the input circuitry 22. At step S202, the input circuitry 22 receives, from the operator, an operation to select a target site of a parametric imaging process. Step S203 is a step executed by the processing circuitry 21 by reading the program corresponding to the obtaining function 211 from the storage circuitry 25. At step S203, the processing circuitry 21 obtains a TIC of each of the pixels contained in the target site. Steps S204 and S205 are steps executed by the processing circuitry 1 by reading the program corresponding to the correcting function 212 from the storage circuitry 25. At step S204, the processing circuitry 21 obtains information about an overlapping region where an image of a dynamic site is overlapping. At step S205, the processing circuitry 21 corrects the TIC of each of the pixels in the overlapping region, by performing at least one selected from the averaging process and the thinning-out process.

Step S206 is a step executed by the image processing circuitry 26 by reading the program corresponding to the image processing process from the storage circuitry 25. At step S206, the image processing circuitry 26 calculates parameter values of each of the pixels by using the corrected TICs in the overlapping region and the uncorrected TICs in the other region and performs the parametric imaging process on the target site on the basis of the calculated parameter values.

As explained above, according to the third embodiment, the correcting function 112 corrects the chronological transition of the signal intensities of the pixels contained in the region where the image of the dynamic site overlaps within the plurality of X-ray images. Accordingly, the X-ray diagnosis apparatus 100 according to the third embodiment makes it possible to shorten the processing time period, because the correcting process is not performed on all the pixels.

Further, according to the third embodiment, by calculating the difference in the signal intensity value of the pixels between at least two mutually-different contrast enhanced regions within the plurality of X-ray images, the correcting function 212 corrects the chronological transition of the signal intensities of the pixels in at least one of the contrast enhanced regions. Accordingly, the X-ray diagnosis apparatus 100 according to the third embodiment is able to accurately identify the divergence signals and to perform the correcting process to eliminate the identified divergence signals and thus makes it possible to generate more accurate TICs. As a result, the X-ray diagnosis apparatus 100 according to the third embodiment makes it possible to understand the state of the blood vessels more accurately.

Fourth Embodiment

The first to the third embodiments have thus been explained. It is possible to carry out the present disclosure in various different modes other than those described in the first to third embodiments above.

In the embodiments described above, the example is explained in which the divergence signals are eliminated by performing the correcting process on the TICs. In that situation, the method for eliminating the divergence signals may be one that uses information of the ECG, for example. In other words, on the basis of the ECG obtained from the electrocardiograph 40, the correcting function 212 brings cardiac phases into correspondence with the frames of the contrast enhanced images. After that, the correcting function 212 extracts frames with which mutually-the-same cardiac phase is kept in correspondence and generates a TIC from the extracted frames. For example, the correcting function 212 is able to generate a TIC containing no divergence signal by extracting frames corresponding to systole and generating the TIC from the extracted frames.

In the embodiments described above, the examples are explained in which the X-ray diagnosis apparatus performs the processes; however, possible embodiments are not limited to this example. For instance, a medical image processing apparatus may perform the processes described above. In that situation, the medical image processing apparatus includes the processing circuitry 21 described above, so that the processes described above are executed.

Further, the constituent elements of the apparatuses and the devices illustrated in the first embodiment are based on a functional concept and do not necessarily have to be physically configured as illustrated in the drawing. In other words, specific modes of distributions and integrations of the apparatuses and the devices are not limited to those illustrated in the drawing. It is acceptable to functionally or physically distribute or integrate all or a part of the apparatuses and the devices in any arbitrary units, depending on various loads and the status of use. Further, all or an arbitrary part of the processing functions performed by the apparatuses and the devices may be realized by a CPU and a computer program analyzed and executed by the CPU or may be realized as hardware using wired logic.

The correcting method explained in the embodiments above may be realized by causing a computer such as a personal computer or a workstation to execute a control computer program (hereinafter, simply "control program") that is prepared in advance. The control program may be distributed via a network such as the Internet. Further, the control program may be recorded on a computer-readable recording medium such as a hard disk, a flexible disk (FD), a Compact Disk Read-Only Memory (CD-ROM), a Magneto-Optical (MO) disk, a Digital Versatile Disk (DVD), or the like, and may also be executed as being read by a computer recording medium.

As explained above, according to at least one aspect of the embodiments described above, it is possible to understand the blood flows accurately.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the inventions.

What is claimed is:

1. A medical image processing apparatus, comprising:
processing circuitry configured to
obtain a chronological transition of signal intensities for each of pixels in a plurality of X-ray images chronologically acquired by using a contrast media; and
correct the chronological transition of the signal intensities based on a level of similarity between at least two mutually-different signal intensities within the chronological transition of the signal intensities,
wherein, by calculating differences in values of signal intensities of pixels between at least two mutually-different contrast enhanced regions within the plurality of X-ray images, the processing circuitry is configured to correct a chronological transition of signal intensities of pixels in at least one of the contrast enhanced regions.

2. The medical image processing apparatus according to claim 1, wherein the processing circuitry is configured to correct chronological transitions of signal intensities of pixels contained in a region where an image of a dynamic site overlaps within the plurality of X-ray images.

3. A medical image processing apparatus, comprising: processing circuitry configured to
obtain a chronological transition of signal intensities for each of pixels in a plurality of X-ray images chronologically acquired by using a contrast media; and
correct the chronological transition of the signal intensities based on a level of similarity between at least two mutually-different signal intensities within the chronological transition of the signal intensities,
wherein, based on the level of similarity between said at least two signal intensities that are positioned adjacent to each other in a time series within the chronological transition of the signal intensities, the processing circuitry is configured to correct the chronological transition of the signal intensities so as to exhibit such a transition that eliminates a value of a signal intensity of a divergence signal having a value diverging from a value of the signal intensity of at least one of the adjacently-positioned signals.

4. The medical image processing apparatus according to claim 3, wherein the processing circuitry is further configured to correct the chronological transition of the signal intensities by determining such a signal that has a value of which a difference from the value of the signal intensity of at least one of the adjacently-positioned signals exceeds a predetermined threshold value as the divergence signal and further thinning out signals by excluding the divergence signal.

5. The medical image processing apparatus according to claim 3, wherein the processing circuitry is further configured to correct the chronological transition of the signal intensities by calculating slopes based on values of signal intensities of the two adjacently-positioned signals, comparing each of the slopes with preceding and following slopes thereof in a time series, determining such a signal that is included in a slope of which differences from the preceding and following slopes both exceed a predetermined threshold value as the divergence signal, and further thinning out signals by excluding the divergence signal.

6. The medical image processing apparatus according to claim 3, wherein the processing circuitry is further configured to correct the chronological transition of the signal intensities of pixels contained in a region where an image of a dynamic site overlaps within the plurality of X-ray images.

7. The medical image processing apparatus according to claim 3, wherein the processing circuitry is further configured to correct the chronological transition of the signal intensities by using a value based on a value of a signal intensity of a divergence signal and values of signal intensities of a predetermined number of signals that are continuous therewith in a time series, as a value of a signal intensity of the divergence signal, the divergence signal having the value diverging from a value of a signal intensity of a signal positioned adjacent thereto in a time series within the chronological transition of the signal intensities.

8. The medical image processing apparatus according to claim 7, wherein the predetermined number is set based on an acquisition rate used for acquiring the plurality of X-ray images and an image taking target site of the plurality of X-ray images.

9. The medical image processing apparatus according to claim 3, wherein the processing circuitry is further configured to correct the chronological transition of the signal intensities by replacing the value of each of the signal intensities of the signals with the value based on the values of the signal intensities of the predetermined number of signals that are continuous, in the time series, with the signal subject to the replacement and subsequently thinning out the signals by excluding any signal that has, after the replacements, a value of which a difference from an adjacently-positioned value exceeds a predetermined threshold value.

10. A medical image processing method, comprising:
obtaining a chronological transition of signal intensities for each of pixels in a plurality of X-ray images chronologically acquired by using a contrast media; and
correcting the chronological transition of the signal intensities based on a level of similarity between at least two mutually-different signal intensities within the chronological transition of the signal intensities, wherein the correcting step includes
correcting, based on the level of similarity between said at least two signal intensities that are positioned adjacent to each other in a time series within the chronological transition of the signal intensities, the chronological transition of the signal intensities so as to exhibit such a transition that eliminates a value of a signal intensity of a divergence signal having a value diverging from a value of the signal intensity of at least one of the adjacently-positioned signals.

* * * * *